United States Patent [19]

Van Gasselt et al.

[11] Patent Number: 4,532,871
[45] Date of Patent: Aug. 6, 1985

[54] FLUIDIZED BED COMBUSTION APPARATUS

[75] Inventors: Max L. G. Van Gasselt, Apeldoorn; Louis M. Rappoldt, Ugchelen, both of Netherlands

[73] Assignee: Nederlandse Centrale Organisatie Voor Toegepast, The Hague, Netherlands

[21] Appl. No.: 580,413

[22] Filed: Feb. 15, 1984

[30] Foreign Application Priority Data

Feb. 18, 1983 [NL] Netherlands .......................... 8300617

[51] Int. Cl.³ ................................................. F23J 3/00
[52] U.S. Cl. ..................................... 110/216; 110/245; 110/263
[58] Field of Search .................. 122/4 D; 431/170; 432/58; 110/216, 245, 263; 60/39.464

[56] References Cited

U.S. PATENT DOCUMENTS 3,910,235 10/1975 Highley ............................... 122/4 D
4,188,184 2/1980 Fornoni ................................. 432/58
4,359,968 11/1982 Stewart ................................ 110/263

Primary Examiner—Carroll B. Dority, Jr.
Attorney, Agent, or Firm—Oliver D. Olson

[57] ABSTRACT

A fluidized bed combustion apparatus in which in the free-board above the bed at least one system of plates or baffles inclined with respect to the vertical is arranged so that at least one upwardly directed channel having internally at least one group of two opposed arrays of superimposed inclined plates is formed, which plates at least alternately extend obliquely downwardly from the outside to the inside and are closely connected with the outer boundary of the channel. Preferably all plates of each array extend obliquely downwardly at an angle with the vertical within 20°–50° from the outside to the inside from a vertical wall defining said channel whereas the plates of the one array are off-set over a distance "s" in the vertical direction with respect to the plates of the other array.

9 Claims, 5 Drawing Figures

U.S. Patent | Aug. 6, 1985 | 4,532,871
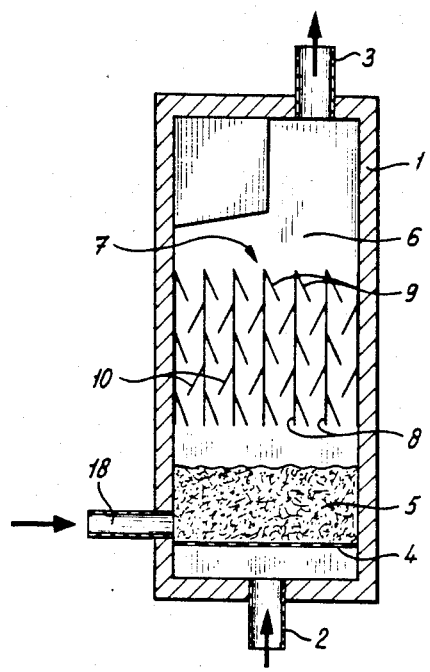
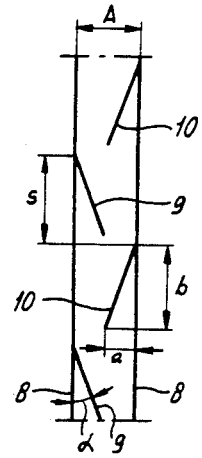
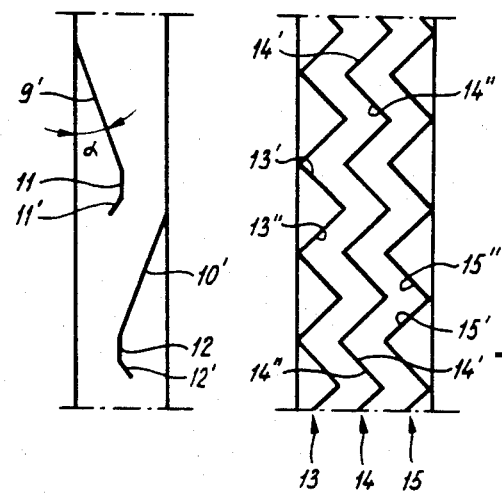
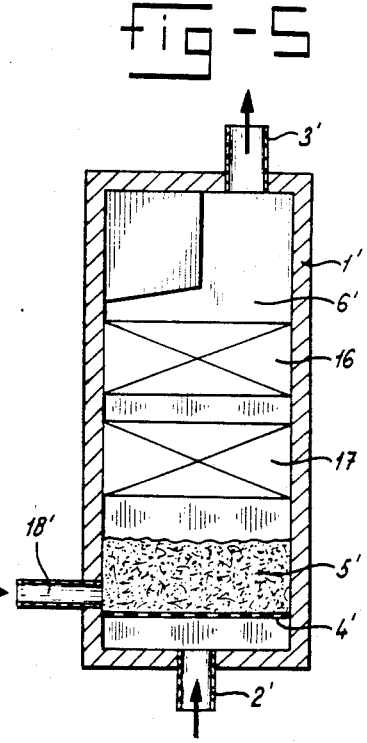

FLUIDIZED BED COMBUSTION APPARATUS

BACKGROUND OF THE INVENTION

The invention relates to a fluidised bed combustion apparatus in which in the free after-burning zone or the so-called free-board above the bed at least one system of plates or baffles inclined with respect to the vertical is arranged so that at least one upwardly directed channel having internally inclined surfaces is formed, such channel, seen in a vertical section in at least one direction, comprising at least one group of two opposed arrays of superimposed inclined plates. An apparatus of this kind is known from the article "Suppression of Particle Elutriation from a Fluidised Bed" in "Trans. Instn. Chem. Engrs", Vol. 52, 1974.

The application of a fluidised bed as a combustion apparatus has been recognized already for a long time as an attractive means for generating energy. In such a bed air is passed through a bed of particulate material consisting of a mixture of inert and combustible materials such as bituminous coal having a high sulfur content and usually an absorbent material mostly limestone, for absorbing sulfur dioxide which is formed as a result of the combustion of the coal. As a result of passing air through the bed said bed is fluidised whereby the combustion of the combustible material is promoted.

The advantages of such a fluidised bed are an outstanding heat transfer, a substantially uniform bed-temperature, a combustion at a relative low temperature, easy handling of the combustible materials, a decreased attack of and formation of deposits in the boiler and a decrease of the dimensions of said boiler and an improved control of the emission of harmful matter.

The quantity and the velocity of the air supplied to the bed must be sufficient for keeping the bed in a fluidised state. As a result a portion of the particulate bed material is entrained by the air which flows through the bed, which material contains among other things particles of the combustible material and of the material for bonding the sulphur which have not reacted. The air which has flown through the bed together with the gaseous combustion products and the particulate material entrained thereby flows in the free-board above the bed which forms a second reaction zone in which the partial combustion of the entrained solid particles and the gaseous combustion products is continued and wherein a partial reduction of the NOx formed in the bed and moreover a continued bonding of sulphur takes place.

After the free board the reaction gases and the entrained granular material are passed to a dust catcher for separating solid particles from the gases, which particles are subsequently discharged or passed to an apparatus which is not linked up with the fluidised bed. Because the granular material as discharged contains solid substances which have not reacted, the efficiency of the fluidized bed combustion apparatus is not optimal.

In order to increase the efficiency of a fluidised bed combustion apparatus, in said article is proposed to arrange in the free board a system of inclined plates or baffles by which system the particles entrained by the air and the combustion gases are for the greater part separated and returned to the fluidised bed. All plates or baffles extend from the outside to the inside in an upwardly inclined position whereas all plates are provided with an opening at the lowermost point adjacent the boundary wall so that the separated solid particles collected on the down stream face of a plate will slide downwardly along the plate and fall down through said opening. However this known arrangement is not efficient as there is the risk that the solid combustible material particles deposited on the plates or baffles will continue to burn and incrustations will be formed by caking. Moreover the solid particles will fall through said openings with difficulty as the upwardly directed flow rate of the air and the combustion gases is the utmost through these openings, for by these openings short-circuit flows between the zones of excess and reduced pressures at the bottom- and topside of a plate respectively will be created. Further, the combustion gases flowing out of the bed will hardly continue to burn, whereas no improved reduction of NOx and an improved continuation of the bonding of the sulphur will take place with respect to a free board without said baffles because the particles have been dropped out of the gas stream.

It is remarked that from U.S. Pat. No. 4,161,917 a thermodynamic generator having a fluidised bed combustion apparatus is known in which in the free-board a plurality of radial extending inclined vanes are arranged so that a rotational movement will be given to the combustion gases and the period of time during which the entrained particles remain in the free-board is extended, since these particles are thrown to the outside so that said particles are burned more completely. However, these particles are thrown against the wall of the free-board, after which no intensive contact between the solid matter and gases occurs anymore. Moreover, a restriction is provided above the vanes which can become clogged up.

SUMMARY OF THE INVENTION

The object of the invention is to provide a free board of the above mentioned type having an improved efficiency.

This object is attained in that according to the invention of each array of superimposed plates or baffles of a channel said plates at least alternately extend obliquely downwardly from the outside to the inside and that all plates at least at their outsides are closely connected with the outer boundary of the channel.

The foregoing and other objects and advantages of this invention will appear from the following detailed description, taken in connection with the accompanying drawing of preferred embodiments.

BRIEF DESCRIPTION OF THE DRAWING

FIG. 1 shows schematically in vertical section a fluidised bed combustion apparatus according to the invention.

FIG. 2 shows on a larger scale one of the channels formed in the free-board of the apparatus according to FIG. 1.

FIG. 3 shows another embodiment of the baffles in a channel.

FIG. 4 shows another embodiment of a channel.

FIG. 5 shows an apparatus as shown in FIG. 1 in which schematically a plurality of systems of obliquely extending plates or baffles is shown.

DESCRIPTION OF THE PREFERRED EMBODIMENTS

As previously mentioned, the fluidised bed combustion apparatus of this invention includes a free-board channel in which is provided at least two arrays of plates or baffles disposed one above the other and inclined downwardly and inwardly from opposite walls of the channel.

Preferably all plates of each array of superimposed plates extend obliquely downwardly at an angle with the vertical within 20°–50° from the outside to the inside from a vertical wall defining said channel whereas the plates of the one array are off-set in the vertical direction with respect to the plates of the other array.

With the plates or baffles arranged in this way according to the invention the solid particles entrained by the gas stream are separated from the main stream by centrifugal forces and are retained for some time while recirculating in the spaces underneath the baffles whereby an intensive solid matter-gas contact occurs. Only at the lowermost baffles entrained particles will impinge on the baffles and fall back into the bed.

By the extended period of time during which the solid particles remain in the free board and the intensive contact between solid particles and gases occurring thereby, the combustible particles are substantially completely burned, whereas the bonding of sulphur with the aid of entrained particles of limestone will be more complete. By attrition and impingments on the baffles of lime particles having already reacted with $SO_2$ the outermost layer of $CaSO_4$ formed thereby will be knocked off, whereby these particles will become active again for the bonding of $SO_4$. The amount of limestone added to the fluidised bed can be less than in the known apparatus. Also the reduction of nitrogen oxides while catalized by active carbon and calcium sulphate or otherwise and the combustion of aliphatic and aromatic hydrocarbons will be more complete.

Thus the flue gases ultimately obtained are cleaned to a great extent. Advantageously thereby an apparatus according to the invention is capable of having a pressurized fluidised bed so that after an additional slight cleaning operation of the flue gases said gases can be passed to a turbine or similar machine for driving the same.

Also the quality of the ashes ultimately obtained is improved in that said ashes substantially do not contain carbon and far less active lime and consist substantially of relative fine particles so that these ashes can be utilized as a filler e.g. in the manufacturing of stones without any additional grinding operation.

The rooms underneath the baffles can be enlarged by providing the baffles with vertically downwardly directed or bent terminal edges. Thereby the periods of time during which the particles remain in these rooms may be affected.

For improving the circulating flows in the rooms underneath the baffles the free end of the baffle is formed by an edge portion which is bent to the outside at an angle with the vertical which is 50° at the most.

Advantageously some of the above mentioned reactions can be accelerated by coating the plates or baffles with or forming them from a material which acts as a catalyzer for some of these reactions.

By forming a plurality of channels disposed side by side the distribution of the flow rates over the cross-sectional area of the free board becomes more uniform, whereby the flow from the bed into the free board is improved.

In an apparatus according to the invention the solid particles leaving the bed and returned thereafter are returned to the same bed as from which they have originated so that in controlling by partial load by means of stopping a bed-section, no accumulation of ash-particles on such stopped bed-section will occur.

Further advantageously, gravity tubes for an overbed-feed and/or a construction for feeding tertiary air can be arranged in the baffle-construction according to the invention, which tertiary air is preferably preheated by the free-board and permits a combustion in the fluidised bed in two stages. The combustible material can be metered on top of the bed by means of a spreader stoker.

The apparatus according to the invention is of compact design, the free-board has a height of only about 3 meter.

As shown in FIG. 1 the fluidised bed combustion apparatus comprises a housing 1 having an inlet 2 for the fluidising combustion air, an outlet 3 for the discharge of combustion gases and an inlet 18 for feeding combustible material and additions. A grid-like distributor plate 4 is arranged inside the housing which supports a bed 5 of granular material to be fluidised.

In the free-board 6 above the bed 5 an array of obliquely extending plates or baffles 7 is arranged.

Said array of obliquely extending plates or baffles 7 comprises a plurality, in FIG. 1 six, of upstanding channels having vertically extending boundary walls 8 and for each channel two opposed arrays of superimposed plates 9 and 10, respectively, which plates extend from walls 8 and are sloping downwardly from the outside to the inside.

As shown in FIG. 2 one array of plates 9 is off-set over a distance "s" with respect to the other array of plates 10. The angle $\alpha$ at which plates 9 and 10 extends obliquely with respect to the vertical is within the range of 20°–50°, whereas the horizontal distance "a" between the free end of a plate 9, 10 and the channel wall 8 amounts to 20–70% of the horizontal distance A between the channel walls 8. In the embodiment shown in FIG. 2 "a" is 50% of A whereas also applies that $\frac{1}{2}b < s < 2b$.

In the embodiment shown in FIG. 3 the free ends of the plates or baffles 9', 10' are formed by a vertically and downwardly extending edge portion 11 and 12 respectively and an edge 11' and 12', respectively, which is bent outwardly at an angle with the vertical of utmost 50°. The edge portions 11' and 12' may be left out so that the free ends of the plates 9' and 10' are formed only by portions 11 and 12.

In FIG. 4 another embodiment of the system of obliquely extending plates or baffles is shown which may replace the system 7 shown in FIG. 1. In this system shown in FIG. 4 each channel is bounded by two arrays of opposing interconnected sloping plates 13, 14 and 14, 15 respectively. For each channel the faces formed by each array of plates are alternately sloping downwardly from the outside to the inside as shown for the faces 13', 14' and 15' so that the other faces 13", 14" and 15" are alternately sloping upwardly from the outside to the inside.

The system as shown in FIG. 4 operates less optimal than the system 7 according to FIG. 1 since in the channels of the system shown in FIG. 4 a downwardly directed flow of heavier particles and an upwardly directed flow of lighter particles is formed.

In FIG. 5 an apparatus is shown which corresponds to the apparatus shown in FIG. 1 so that similar elements are denoted with the same reference numerals provided with an accent. By reference numerals 16 and 17 is schematically shown that in free-board 6' a plurality of systems of sloping plates or baffles are arranged on top of each other. The systems 16 and 17 vary from each other with respect to one or more of the parameters α, a, b, s and A so that the fact may be taken into account that higher up in the system having substantially equal parameters, the solid particles get gradually smaller and lighter so that the chance that the particles are separated from the main flow gets smaller according as the particles arrive at a higher elevation in the system.

It will be apparent to those skilled in the art that various changes may be made in the structural details described hereinbefore without departing from the spirit of this invention and the scope of the appended claims.

I claim:

1. A fluidized bed combustion apparatus, comprising:
   (a) a housing,
   (b) support means in the housing adjacent the bottom thereof for supporting a bed of particulate material including particulate combustible material,
   (c) particulate infeed means adjacent the support means for supplying particulate material to said support means,
   (d) air inlet means in the housing below the support means for supplying combustion air to a bed of particulate material on the support means,
   (e) combustion gas outlet means in the top of the housing,
   (f) a plurality of upwardly directed channel walls in the housing above the support means defining a channel between adjacent walls, and
   (g) a pair of opposed arrays of superimposed plates in each channel, the plates of one array of the pair extending obliquely downward and inward from one channel wall, and the plates of the other array of the pair extending obliquely downward and inward from the opposite wall of said channel.

2. An apparatus according to claim 1, characterized in that all plates of each array of superimposed plates extend obliquely downwardly at an angle with the vertical within 20°–50° and the plates of the one array are off-set in the vertical direction with respect to the plates of the other array.

3. Apparatus according to claim 2, characterized in that the horizontal distance "a" between the free end of a plate and the channel wall from which said plate extends equals 20–70% of the horizontal distance "A" between said channel wall and the opposing channel wall.

4. Apparatus according to claim 2 or 3, characterized in that the distance "s" over which the plates of the one array are off-set with respect to the other array varies over the length of the channel.

5. Apparatus according to claim 4, characterized in that the plates of each array extend to the center of the channel and further applies $\frac{1}{2}b<s<2b$ in which "b" stands for the length of the vertical projection of a plate.

6. Apparatus according to any one of claims 2–5, characterized in that the free end of a plate is formed by a vertical downwardly extending edge portion.

7. Apparatus according to any one of claims 2–6, characterized in that the free end of a plate is formed by an edge portion which is bent to the outside at an angle with the vertical which is 50° at the most.

8. Apparatus according to any one of claims 2–7 or 1, characterized in that the plates are coated with or formed from a catalyzer material.

9. Apparatus according to any one of claims 2–8 or 1, characterized in that a plurality of systems of sloping plates are arranged on top of each other.

* * * * *

UNITED STATES PATENT AND TRADEMARK OFFICE
CERTIFICATE OF CORRECTION

PATENT NO. : 4,532,871
DATED : 6 August 1985
INVENTOR(S) : Max L.G. van Gasselt and Louis M. Rappoldt It is certified that error appears in the above-identified patent and that said Letters Patent are hereby corrected as shown below:

On the title page, code 73, the Assignee should read
-- Nederlands Centrale Organisatie Voor Toegepast -
Natuurwetenschappelijk Onderzoek --.

Signed and Sealed this

Eighteenth Day of March 1986

[SEAL]

Attest:

DONALD J. QUIGG

Attesting Officer

Commissioner of Patents and Trademarks